(12) United States Patent
Hunt et al.

(10) Patent No.: US 7,606,643 B2
(45) Date of Patent: Oct. 20, 2009

(54) TECHNIQUE FOR PROVIDING MANAGEMENT OF A MOTOR VEHICLE INFORMATION SYSTEM

(75) Inventors: Gerald P. Hunt, Fishers, IN (US); Laxman D. Kapaleshwari, Noblesville, IN (US); Keith R. Halsall, West Chicago, IN (US); Mark A. Kady, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 722 days.

(21) Appl. No.: 11/407,517

(22) Filed: Apr. 20, 2006

(65) Prior Publication Data

US 2007/0250220 A1 Oct. 25, 2007

(51) Int. Cl.
*G06F 7/00* (2006.01)
(52) U.S. Cl. ............... 701/36; 701/29; 701/35; 340/438
(58) Field of Classification Search ........ 701/1, 701/2, 20, 29, 33, 35, 36; 455/11.1, 39, 73, 455/412.2, 151.2; 342/357.1; 340/425.5, 340/438, 439
See application file for complete search history.

(56) References Cited

U.S. PATENT DOCUMENTS 4,099,437 A * 7/1978 Stavrou et al. ............... 84/617

FOREIGN PATENT DOCUMENTS

| DE | 19832203 | 1/2000 |
| EP | 0502566 | 9/1992 |
| WO | 03036541 | 5/2003 |
| WO | 2004/084413 | 9/2004 |

OTHER PUBLICATIONS

Miller M J et al: "Minimizing energy consumption in sensor networks using a wakeup radio" Wireless Communications and Networking Conference, 2004. WCNC. 2004 IEEE Atlanta, GA, USA Mar. 21-25, 2004, Piscataway, NJ, USA, IEEE, vol. 4, Mar. 21, 2004, pp. 2335-2340, XP010708324 ISBN: 0-7803-8344-3 *abstract* * sections I. and II.
Sheth A et al: "Adaptive power control and selective radio activation for low-power infrastructure-mode 802.11 LANs" Multimedia Signal Processing, 2002 IEEE Workshop on Dec. 9-11, 2002, Piscataway, NJ, USA, IEEE, May 19, 2003, pp. 812-818, XP 010642469 ISBN: 0-7803-7713-3 *abstract* *section 4.

* cited by examiner

*Primary Examiner*—Gertrude Arthur Jeanglaud
(74) *Attorney, Agent, or Firm*—Jimmy L. Funke

(57) ABSTRACT

A technique for providing management of a motor vehicle information system includes a number of steps. Initially, a wake-up message is received from a portable transmitter. In general, the wake-up message, unique to the portable transmitter, is provided responsive to user activation of a button that is electrically coupled to the portable transmitter. Next, it is determined whether power capability of the motor vehicle is adequate responsive to receipt of the wake-up message. When the motor vehicle power capability is adequate, power is provided to a wireless interface, a vehicle information system and a mass storage device, all of which are located within the motor vehicle. Information is then received via the wireless interface and stored in the mass storage device, when the power capability of the motor vehicle is adequate.

20 Claims, 4 Drawing Sheets

TECHNIQUE FOR PROVIDING MANAGEMENT OF A MOTOR VEHICLE INFORMATION SYSTEM

TECHNICAL FIELD

The present invention is generally directed to a technique for providing management of a motor vehicle information system and, more specifically, providing power management, network and system security for a motor vehicle information system.

BACKGROUND OF THE INVENTION

Today, vehicle information systems implemented within motor vehicles have fairly extensive data communication and data storage capabilities. In order to effectively implement such vehicle information systems, a designer should address various power management, network and system security issues. With respect to power management, a vehicle information system with a hard drive or a wireless local area network (LAN), e.g., an IEEE 802.11 wireless LAN, will generally deplete a battery of a motor vehicle in a matter of a few hours, if the vehicle information system is allowed to run after the motor vehicle is turned off.

Currently, power management of a vehicle information system is implemented by placing the vehicle information system into standby, shortly after the motor vehicle is turned off. When the motor vehicle is turned off, the motor vehicle must then be started for the vehicle information system to function or at least a portion of the vehicle information system must periodically awake to determine if any external devices are attempting to communicate with the vehicle information system. In the former case, a user of the vehicle information system must start the motor vehicle each time the individual wishes to communicate with the vehicle information system to, for example, download music or video files from a personal computer (PC) to the vehicle information system. It should be appreciated that requiring a user to start the motor vehicle, each time the user wished to download information from the user's PC to the vehicle information system, is highly inconvenient. Assuming a portion of the vehicle information system is designed to periodically awake to detect an attempted communication, the user may also become frustrated with the downloading process, as a typical wake-up cycle would be about five to ten minutes.

In a typical vehicle information system, network management is minimal, as the network is on when the vehicle information system is on and off otherwise. This creates a network security issue, as the system is subject to unwanted connectivity from malicious users and other intrusive invasion of the vehicle information system, when the motor vehicle is running. In general, the vehicle information system could implement the same or similar network security as the personal computer (PC) to which the vehicle information system is designed to communicate. While certain security protocols exist to protect home PCs, such as wired equivalent privacy (WEP), frequently the security protocols are not implemented and/or are not enabled on home PCs. While this may be tolerable for a PC located within a residence, failing to implement a security protocol for a vehicle information system is undesirable, as an original equipment manufacturer (OEM) has generally been required to warrant operation of the vehicle information system.

For example, when a virus is introduced to a home PC, the owner of the PC is responsible for fixing the problem. However, when if a virus is introduced to a vehicle information system associated with a motor vehicle, an automobile dealer may be required to fix the system, for example, at the expense of the system manufacturer. Further, as more in-vehicle systems allow downloading of information onto storage media, e.g., flash memory and hard disk drives, associated with the motor vehicle (via, for example, a universal serial bus (USB) attached plug and play device or other media, such as a compact disc (CD)), unauthorized downloads may occur. For example, secondary drivers of a motor vehicle may download copyrighted music or video to a mass storage device, within the motor vehicle, in violation of copyright laws. Additionally, the unauthorized downloads may introduce viruses to the vehicle information system and utilize an unacceptable amount of storage space.

What is needed is a convenient technique for remotely activating a vehicle information system, within a motor vehicle, to allow for downloading data from a remote computer. It would also be desirable for the technique to facilitate improved network and system security.

SUMMARY OF THE INVENTION

According to one embodiment of the present invention, a technique for providing management of a motor vehicle information system includes a number of steps. Initially, a wake-up message is received from a portable transmitter. In general, the wake-up message is unique to the portable transmitter and may be provided responsive to user activation of a dedicated button that is electrically coupled to the portable transmitter. Next, it is determined whether power capability of the motor vehicle is adequate, responsive to receipt of the wake-up message. When the motor vehicle power capability is adequate, power is provided to a wireless interface, a vehicle information system and a mass storage device, all of which are located within the motor vehicle. Information is then received, via the wireless interface, and stored in the mass storage device, when the power capability of the motor vehicle is adequate.

According to another embodiment of the present invention, the portable transmitter is included within a keyfob associated with the motor vehicle. According to a different aspect of the present invention, the mass storage device is one of a flash memory and a hard disk drive. According to a different embodiment of the present invention, the wireless interface is compatible with the IEEE 802.11 specification. According to another aspect of the present invention, the technique further includes starting a timer following receipt of the wake-up message and removing power from the wireless interface, the vehicle information system and the mass storage device, when the timer expires to provide a network security feature.

According to a different aspect of the present invention, power is removed from the wireless interface, the vehicle information system and the mass storage device, when download of the information is complete. According to at least one aspect of the present invention, the information may include a plurality of music files, which may be, for example, motion picture expert group 3 (MP3) files. According to yet another embodiment, the information is only stored in the mass storage device when a received identification (ID) signal corresponds to an authorized ID signal that is allowed to store information on the mass storage device.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
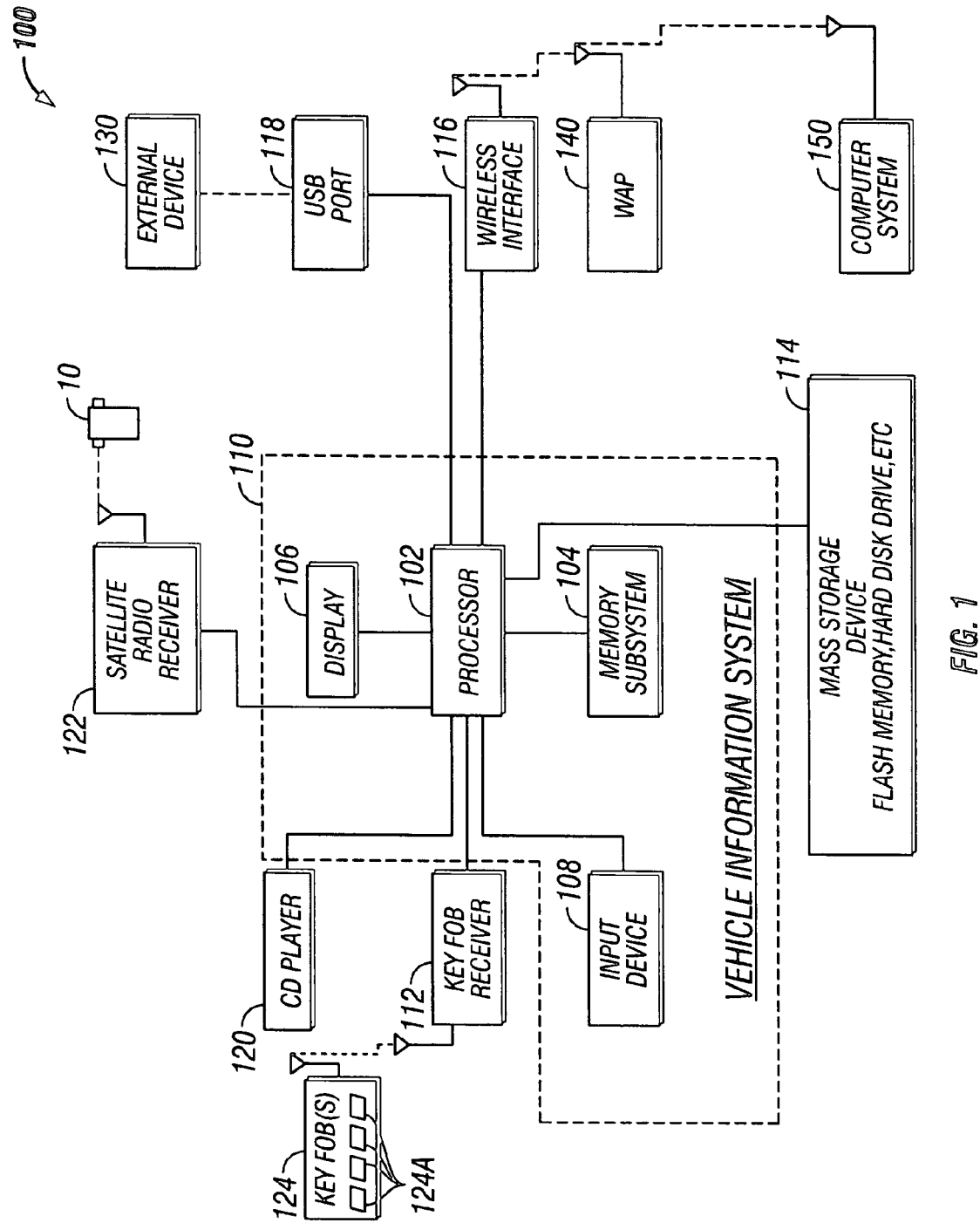
FIG. 1 depicts an electrical block diagram of an exemplary motor vehicle system that includes a vehicle information system.

As is discussed above, power management, network and system security issues have become increasingly important for next generation vehicle information systems. According to one embodiment of the present invention, unique codes provided by a keyfob are utilized to initiate power management, network and system security features needed to allow data to be downloaded to the motor vehicle, via a wireless interface. With respect to power management, it is common today for motor vehicles to have a keyless entry system or some other implementation of a keyfob system. In general, power management for a wireless interface download may be readily implemented through the addition of an additional pushbutton (i.e., a wake-up button) on the keyfob. The wake-up button provides a unique wake-up signal that wakes up the vehicle information system, when a download is desired. Once awake, the vehicle information system can readily connect to a user's personal computer, via a wireless LAN. In general, this technique allows a user to connect to the vehicle information system, without requiring the user to physically walk to the motor vehicle and activate the vehicle information system by starting the motor vehicle.

In a usual implementation, a wake-up module is implemented to monitor the power state of the vehicle, such that when the wake-up button of the keyfob is pressed, a timer is initiated that automatically shuts the vehicle information system off, if there is no activity for a given period of time. The wake-up module may also monitor vehicle power reserves and shut the system off, in the event that a download requires so much power that the motor vehicle battery drops below a desired voltage level.

In general, a wake-up module may be added to the motor vehicle without additional power budget cost, as a typical motor vehicle already includes a keyfob receiver that is listening for a transmission signal. Further, there are minimal engineering costs to implement this embodiment of the present invention, as the vehicle information system may wake-up on a signal provided from the same vehicle data bus on which the keyfob normally transmits door unlock and start commands. Thus, using keyfob signals to wake-up the vehicle information system readily allows for downloads to the vehicle information system, with little additional hardware cost.

With respect to network security, a specific keyfob and a key press, under the condition of the vehicle being in communication with a dealer PC, may put the device into a dealer mode, or other desired mode, which allows network registration with a dealer. When the vehicle information system is placed in a dealer mode, the vehicle information system may then provide diagnostic data to the PC associated with the dealer, for analysis, as well as service information, which is then available to a diagnostic technician and/or the vehicle owner. Utilizing a keyfob associated with a motor vehicle to activate the vehicle wireless interface also allows the network of the motor vehicle to be more secure. That is, when an appropriate button on the keyfob is pressed, the wireless interface is activated for communication, for a predetermined period of time as set by a system access timer. Implementing the system access timer allows the vehicle information system to be available for a finite period of time, to minimize the risk of tampering with the system.

With respect to system security, a built-in code for current keyfobs allows a motor vehicle to distinguish between various fobs, which are allowed to communicate with the vehicle. The keyfob identification (ID) codes can be used to control the activation of a universal serial bus (USB) port and other devices associated with the vehicle information system. For example, the keyfob ID code received by the keyless entry system to open the door can be utilized to set access privileges for an entertainment system. In this embodiment, during setup of the vehicle information system, the driver selects privilege levels of other electronic keyfobs. For example, a driver's keyfob would typically include all privileges, whereas a secondary keyfob, with a different ID code, may be limited to a play only mode for any media, and a third keyfob, with a different ID code, may be, for example, limited to a radio only mode.

In general, this system security feature helps to prevent unwanted data, such as music downloads or viruses, from being stored on a mass storage device, e.g., a hard disk drive, associated with the vehicle information system. Further, the detection of a specific keyfob can be used to activate a universal serial bus (USB) port so that an attached mass storage device can provide downloadable information to selected directories on the hard disk drive. In addition, a specific USB mass storage device may be made active and data from the device may be downloaded to any directory or a specific directory associated with the owner of the keyfob.

With reference to FIG. 1, an exemplary motor vehicle system 100 is depicted that includes a vehicle information system 110. The vehicle information system 110 includes a processor 102 coupled to a memory subsystem 104, a display 106 and an input device 108. The processor 102 is also coupled to a keyfob receiver 112 that receives commands from a plurality of keyfobs 124. The processor 102 receives communications from a personal computer (PC) 150, via a wireless interface 116 and via a wireless access point (WAP) 140. The processor 102 is also coupled to a mass storage device 114, which may include a flash memory, hard disc drive, etc. The processor 102 is also coupled to a universal serial bus (USB) port 118, which may be coupled to an external device 130, in order to provide information to be downloaded to the mass storage device 114 or other storage media. The processor 102 is also coupled to a CD player (or other media player) 120 and a satellite radio receiver 122. The processor 102 may also select programming received from a satellite 10, received via the satellite radio receiver 122.

Figure 2:
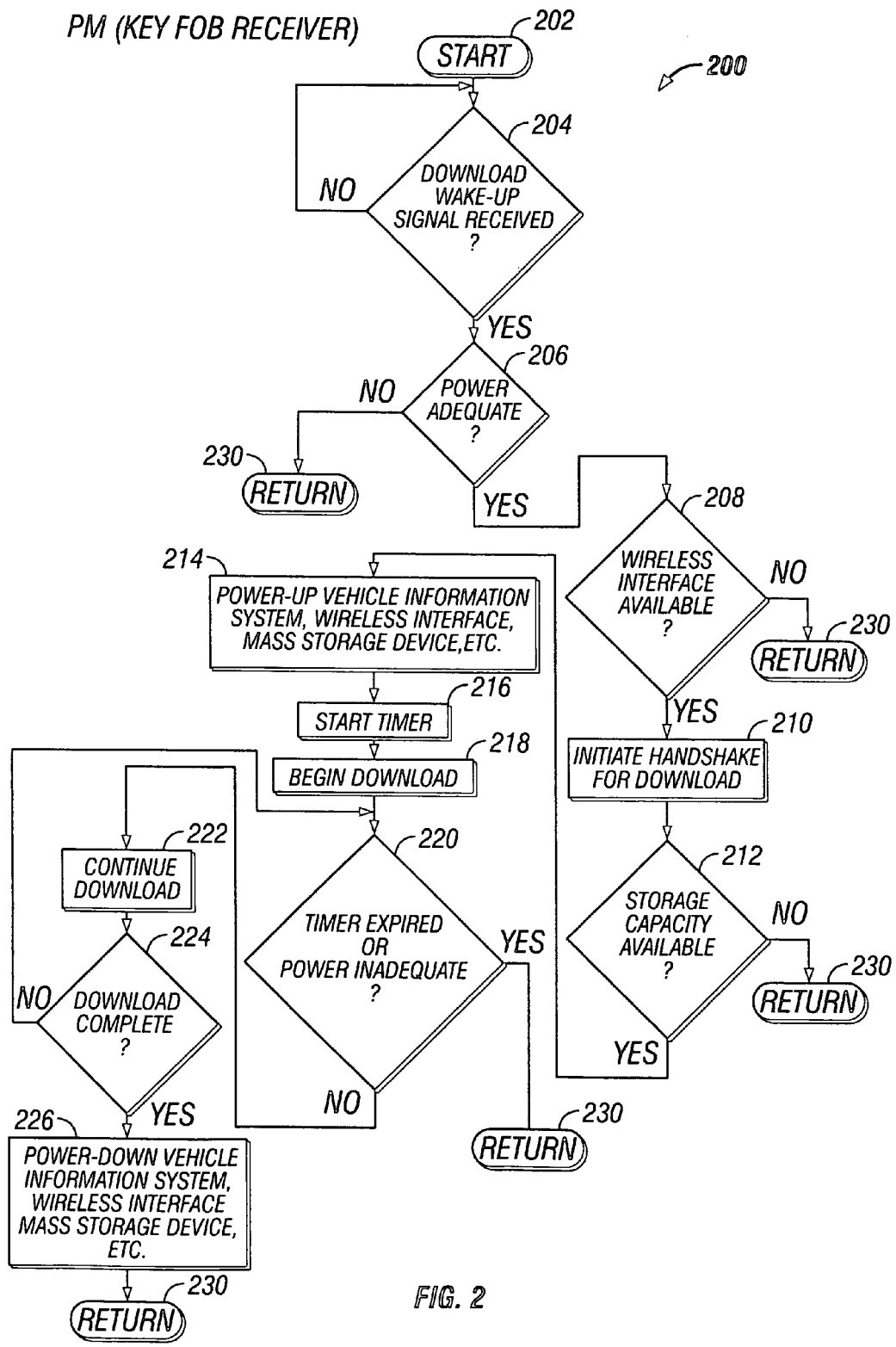
FIG. 2 depicts a power management routine that manages power for the vehicle information system of FIG. 1.

With reference to FIG. 2, an exemplary power management routine 200 is depicted, which manages the battery power of an associated motor vehicle. The routine 200 is initiated in step 202, at which point control transfers to decision step 204, where the processor 102, implementing the routine 200, determines whether a download wake-up signal has been received from the keyfob(s) 124. In step 204, when a download wake-up signal is received, control transfers to decision step 206, where the processor 102 determines whether the current power of the motor vehicle is adequate to perform the download. If not, control transfers from step 206 to step 230, where the routine 200 returns to a calling routine.

In step 206, when the motor vehicle power is adequate to perform the download, control transfers to decision step 208, where the processor 102 determines whether the wireless interface 116 is available. If the wireless interface 116 is not available, control transfers from step 208 to step 230. Otherwise, control transfers from step 208 to step 210, where the processor 102 initiates a handshake with the PC 150 to initiate downloading of the information. Next, in decision step 212, the processor 102 determines whether a required amount of storage capacity is available on the mass storage device 114. If the required amount of storage capacity is not available, control transfers to step 230. If a required amount of storage capacity is available in step 212, control transfers to step 214, where the processor 102 causes the motor vehicle information system 110, the wireless interface 116 and the mass storage device 114 to be powered up.

Next, in step 216, the processor 102 starts a timer. Then, in step 218, the processor 102 initiates download of the information. Next, in decision step 220, the processor 102 determines whether the timer has expired or if the motor vehicle power is no longer adequate. If the timer has expired or the motor vehicle power is no longer adequate, control transfers to step 230. Otherwise, control transfers from step 220 to step 222, where download of the information is continued. Next, in step 224, the processor 102 determines whether the download is complete. If not, control transfers from step 224 to step 220. When the download is complete in step 224, control transfers to step 226, where the processor 102 causes the vehicle information system 110, the wireless interface 116 and the mass storage device 114 to be powered down. Then, in step 230, the processor 102 returns control to the calling routine.

Figure 3:
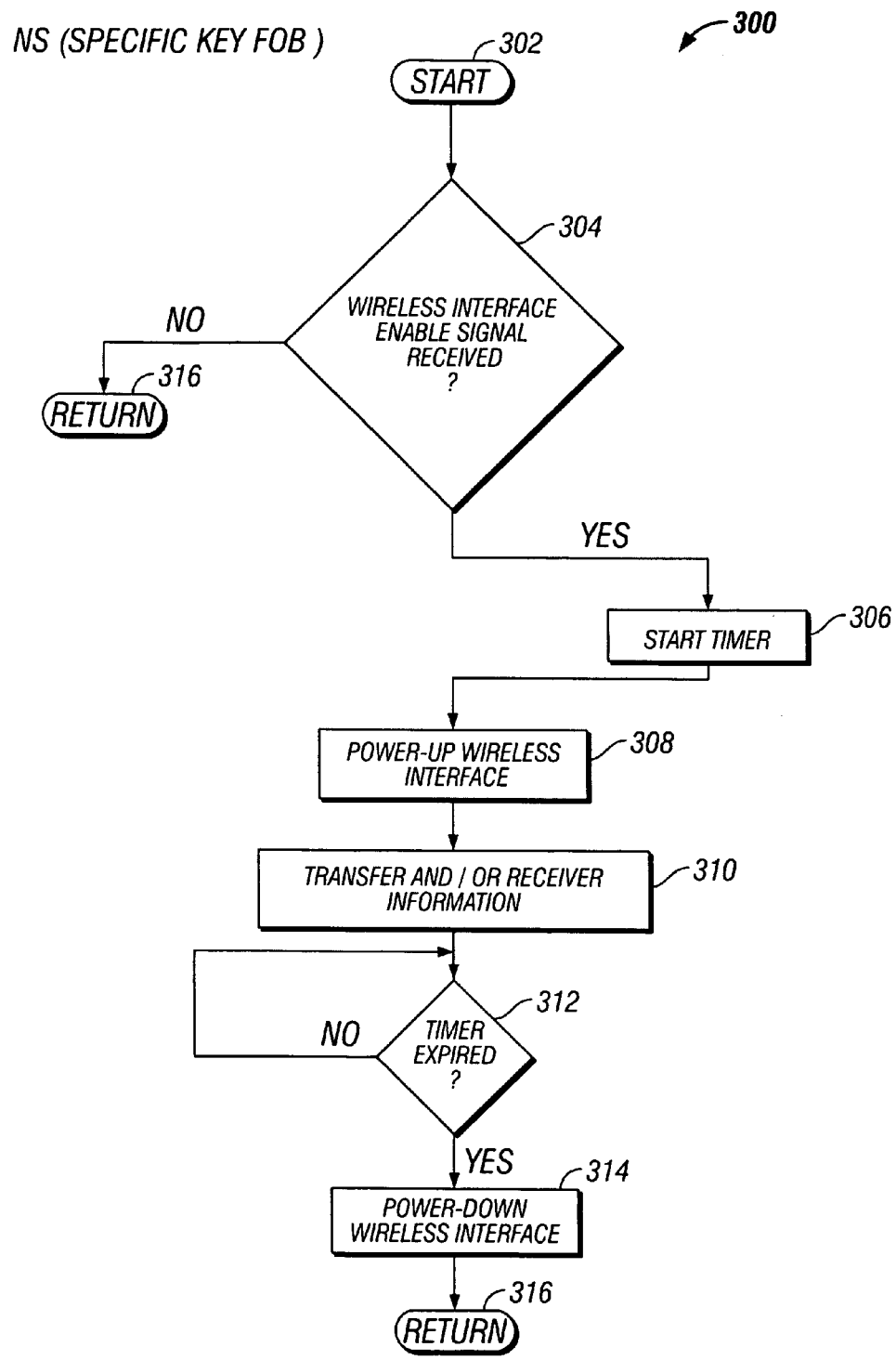
FIG. 3 depicts a network security routine that provides a network security feature for the vehicle information system of FIG. 1.

With reference to FIG. 3, a network security routine 300 is depicted, which provides a security feature for the vehicle information system 110. In step 302 the routine 300 is initiated, at which point control transfers to decision step 304. In step 304, the processor 102 determines whether a wireless interface 116 enable signal has been received. As discussed above, the enable signal is provided by one of the keyfob(s) 124, associated with the motor vehicle, responsive to actuation of a button of the keyfob. If the enable signal is received, control transfers to step 306, where the processor 102 starts an associated timer. If the enable signal is not received in step 304, control transfers to step 316, where control returns to a calling routine. From step 306, control transfers to step 308, where the processor 102 causes the wireless interface 116 to be powered up.

Next, in step 310, the processor 102 determines whether information is to be transferred or received and continues the communication. Then, in decision step 312, the processor 102 determines whether the timer has expired. If the timer has not expired in step 312, control loops on step 312 to allow continued communication, until the timer expires. When the timer expires, control transfers to step 314, where the processor 102 causes the wireless interface 116 to be powered down. Next, control transfers to step 316, where control returns to the calling routine.

Figure 4:
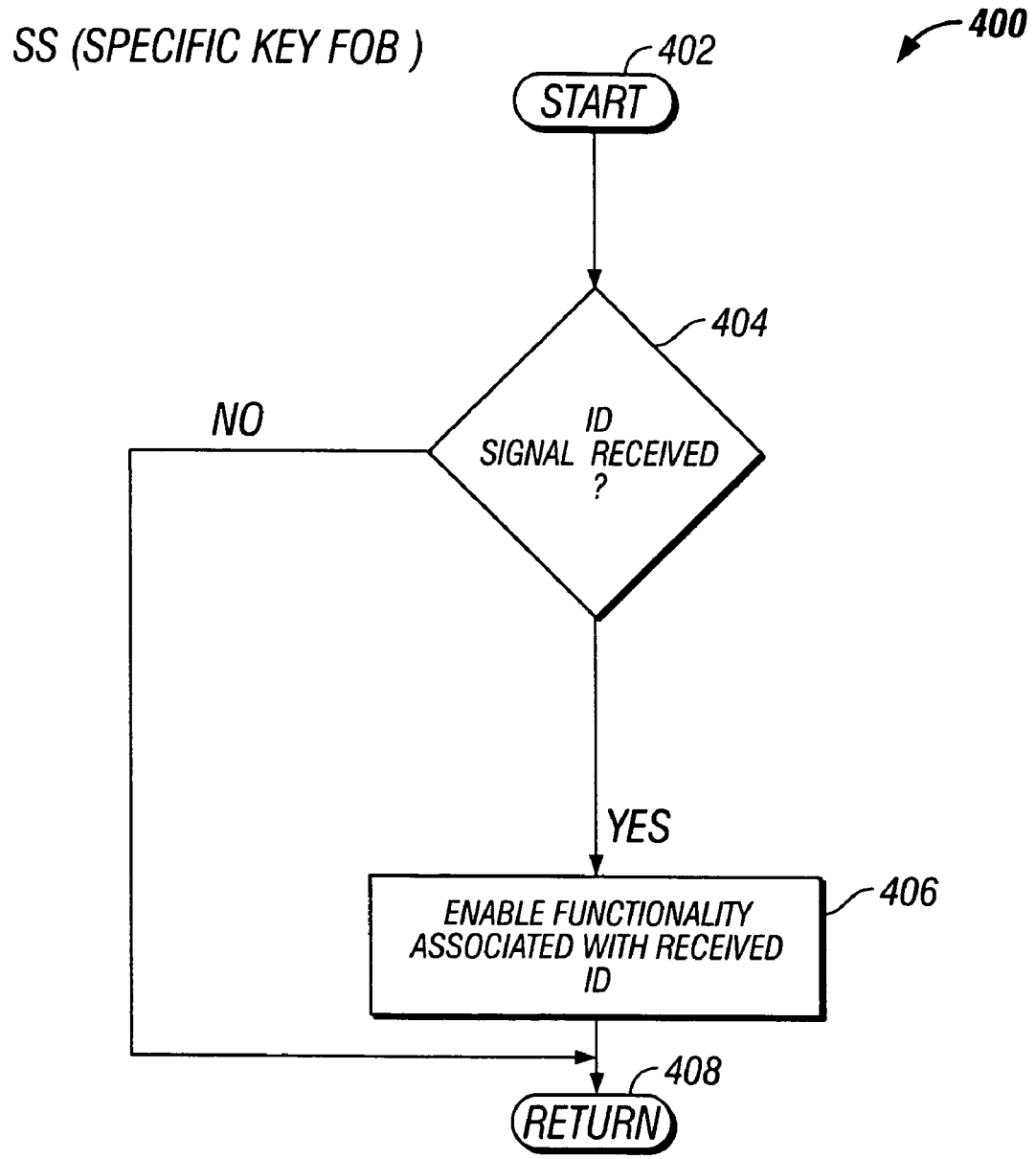
FIG. 4 depicts a system security routine that implements system security for the vehicle information system of FIG. 1, according to a specific keyfob identification (ID) received.

With reference to FIG. 4, an exemplary identification signal routine 400 is depicted, which facilitates the implementation of system security, according to a specific keyfob identification (ID) code received. In step 402, the routine 400 is initiated, at which point control transfers to decision step 404, where the processor 102 determines whether an ID signal has been received. If not, control transfers to step 408, where control is returned to the calling routine. If an ID signal is received in step 404, control transfers to step 406, where the processor 102 enables the functionality associated with the received ID code. As previously discussed, if the required ID code is the ID code associated with the driver's keyfob, then all privileges associated with an entertainment system are usually enabled. For example, when a driver's keyfob ID code is received, download and storage of various files may be enabled from, for example, an external device 130, via the USB port 118, or via the wireless interface 116. As previously discussed, the information received via the wireless interface 116 or the USB port 118 may be downloaded to the mass storage device 114. Next, in step 408, control returns to the calling routine.

Accordingly, an information system that implements power management, network and system security has been described herein. Such a system may advantageously be implemented within a motor vehicle.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for providing management of a motor vehicle information system, comprising the steps of:
receiving a wake-up message from a portable transmitter, wherein the wake-up message is unique to the portable transmitter and is provided responsive to user activation of a button that is electrically coupled to the portable transmitter;
determining whether power capability of a motor vehicle is adequate responsive to receipt of the wake-up message;
providing power to a wireless interface, a vehicle information system and a mass storage device when the motor vehicle power capability is adequate, wherein the wireless interface, the vehicle information system and the mass storage device are located within the motor vehicle; and
receiving information via the wireless interface and storing the information in the mass storage device, when the power capability of the motor vehicle is adequate.

2. The method of claim 1, wherein the portable transmitter is included within a keyfob associated with the motor vehicle.

3. The method of claim 1, wherein the mass storage device is one of a flash memory and a hard disk drive.

4. The method of claim 1, wherein the wireless interface is compatible with the IEEE 802.11 specification.

5. The method of claim 1, further comprising the step of:
starting a timer following receipt of the wake-up message; and
removing power from the wireless interface, the vehicle information system and the mass storage device when the timer expires.

6. The method of claim 1, further comprising the step of:
removing power from the wireless interface, the vehicle information system and the mass storage device when download of the information is complete.

7. The method of claim 1, wherein the received information includes a plurality of music files.

8. The method of claim 1, wherein the received information is only stored in the mass storage device when a received identification (ID) signal corresponds to an authorized ID signal that is allowed to store information on the mass storage device.

9. A system for providing management of a motor vehicle information system, comprising:
 a receiver for receiving a wake-up message from a portable transmitter, wherein the wake-up message is unique to the portable transmitter and is provided responsive to user activation of a button that is electrically coupled to the portable transmitter;
 a processor coupled to the receiver; and
 a memory subsystem coupled to the processor, the memory subsystem storing code that when executed by the processor instructs the processor to perform the steps of:
  determining whether power capability of an associated motor vehicle is adequate responsive to receipt of the wake-up message;
  providing power to a wireless interface, a vehicle information system and a mass storage device when the motor vehicle power capability is adequate, wherein the wireless interface, the vehicle information system and the mass storage device are located within the motor vehicle; and
  receiving information via the wireless interface and storing the information in the mass storage device, when the power capability of the motor vehicle is adequate.

10. The system of claim 9, wherein the portable transmitter is included within a keyfob associated with the motor vehicle.

11. The system of claim 9, wherein the mass storage device is one of a flash memory and a hard disk drive.

12. The system of claim 9, wherein the wireless interface is compatible with the IEEE 802.11 specification.

13. The system of claim 9, wherein the memory subsystem stores additional code that when executed by the processor instructs the processor to perform the additional steps of:
 starting a timer following receipt of the wake-up message; and
 removing power from the wireless interface, the vehicle information system and the mass storage device when the timer expires.

14. The system of claim 9, wherein the memory subsystem stores additional code that when executed by the processor instructs the processor to perform the additional step of:
 removing power from the wireless interface, the vehicle information system and the mass storage device when download of the information is complete.

15. The system of claim 9, wherein the information includes a plurality of music files.

16. The system of claim 15, wherein the information is only stored in the mass storage device when a received identification (ID) signal corresponds to an authorized ID signal that is allowed to store information on the mass storage device.

17. A system for providing management of a motor vehicle information system, comprising:
 a receiver for receiving a wake-up message from a portable transmitter, wherein the wake-up message is unique to the portable transmitter and is provided responsive to user activation of a button that is electrically coupled to the portable transmitter;
 a processor coupled to the receiver; and
 a memory subsystem coupled to the processor, the memory subsystem storing code that when executed by the processor instructs the processor to perform the steps of:
  determining whether power capability of an associated motor vehicle is adequate responsive to receipt of the wake-up message;
  providing power to a wireless interface, a vehicle information system and a mass storage device when the motor vehicle power capability is adequate, wherein the wireless interface, the vehicle information system and the mass storage device are located within the motor vehicle; and
  receiving information via the wireless interface and storing the information in the mass storage device, when the power capability of the motor vehicle is adequate and a received identification signal indicates that allows for storage of the information on the mass storage device.

18. The system of claim 17, wherein the portable transmitter is included within a keyfob associated with the motor vehicle, and wherein the mass storage device is one of a flash memory and a hard disk drive.

19. The system of claim 18, wherein the information is only stored in the mass storage device when a received identification (ID) signal corresponds to an authorized ID signal that is allowed to store information on the mass storage device.

20. The system of claim 19, wherein the memory subsystem stores additional code that when executed by the processor instructs the processor to perform the additional steps of:
 starting a timer following receipt of the wake-up message; and
 removing power from the wireless interface, the vehicle information system and the mass storage device when the timer expires.

* * * * *